United States Patent
Bartholomä et al.

(10) Patent No.: US 6,394,690 B1
(45) Date of Patent: May 28, 2002

(54) CONNECTION FITTING WITH AN ATTACHMENT PROJECTION DIVIDED BY SLITS INTO HOLDING TONGUES

(75) Inventors: Mario Bartholomä, Winden; Fritz Zügel, Waldkirch; Volker Götz, Kenzingen; Jürgen Adolf, Denzlingen, all of (DE)

(73) Assignee: Anton Hummel Verwaltungs GmbH, Waldkirch (DE)

( * ) Notice: Subject to any disclaimer, the term of this patent is extended or adjusted under 35 U.S.C. 154(b) by 0 days.

(21) Appl. No.: 09/323,732

(22) Filed: Jun. 1, 1999

(30) Foreign Application Priority Data

Jun. 24, 1998 (DE) .......................... 198 28 059

(51) Int. Cl.⁷ .............................. B25G 3/24
(52) U.S. Cl. ................................. 403/290
(58) Field of Search ................. 403/230, 240, 403/241, 188, 187, 192, 195, 200, 201; 285/207, 208, 209, 210, 204, 140.1

(56) References Cited

U.S. PATENT DOCUMENTS

| | | | |
|---|---|---|---|
| 1,246,102 A | * | 11/1917 | Janofsky |
| 1,717,389 A | * | 6/1929 | Kipnis |
| 1,745,941 A | * | 2/1930 | Metcalf, Jr. |
| 1,885,581 A | * | 11/1932 | Bradbury |
| 1,902,229 A | * | 3/1933 | Goetzelman |
| 2,038,290 A | * | 4/1936 | Hooley |
| 2,514,504 A | * | 7/1950 | Moline |
| 3,415,549 A | * | 12/1968 | Chatham |
| 6,082,782 A | * | 7/2000 | Barhtoloma et al. ..... 285/140.1 |

FOREIGN PATENT DOCUMENTS

| | | | |
|---|---|---|---|
| DE | GM 69 449 41 | * | 11/1969 |
| DE | 42 25 263 C1 | * | 2/1994 |
| DE | 297 01 321 U1 | | 7/1998 |
| EP | 0 206 896 A1 | | 12/1986 |
| FR | 0 206 896 A1 | * | 12/1986 |
| GB | 2 126 803 A | | 3/1984 |
| JP | 6-58463 | * | 6/1994 |
| WO | WO 98/15764 | | 4/1998 |

* cited by examiner

Primary Examiner—Lynne H. Browne
Assistant Examiner—Tomlyne A Malcolm
(74) Attorney, Agent, or Firm—Akin, Gump, Strauss, Hauer & Feld, L.L.P.

(57) ABSTRACT

A connection fitting (1) for the attachment of oblong structures, for example of cables (2), hoses, tubes, corrugated hoses or the like, to an opening (3), in particular, for passing through such an opening (3) while at the same time being attached is provided. The opening (3) involves a hole, a drill hole, or other opening in a wall (4), for example of a housing. The connection fitting (1) is constructed as a plug-in fitting, i.e. is readily affixed to the opening (3) by axial insertion into it. For this it has an attachment projection (5) which is subdivided by axial slits into retaining tongues, which have radially projecting retaining projections (8) on the outside that extend behind the edge (3a) of the opening (3) when the attachment projection (5) is inserted into the opening (3), such that they yield somewhat radially to the inside during insertion and after being stuck through, automatically move again radially outwardly. By an axial movement of the connection fitting (1) opposite its plug-in direction, the retaining tongues (7) can in turn be deformed in the radial direction against the oblong structure or a cable (2) that is to be affixed and then clamped onto it. Thus, on the outside of the opening (3), a stopper (9) is provided so that the connection fitting (1) is supported on the outside. The sheath that has the stopper (9) has a support (11), which extends axially into the opening (3) and which in the assembly position engages on a partial area of the outside of the retaining tongues (7) of the attachment projection (5), and during an axial movement of the attachment projection (5) and the retaining tongues (7), impinges a conical or tapering area of the outside of the retaining tongues (7) in such a way that the retaining tongues (7) are pressed together in the radial direction so that a contact of the retaining tongues (7) with the edge (3a) that is engaged behind is avoided or if necessary done with a considerably less force than is applied for a radial deformation of the retaining tongues (7).

17 Claims, 3 Drawing Sheets

CONNECTION FITTING WITH AN ATTACHMENT PROJECTION DIVIDED BY SLITS INTO HOLDING TONGUES

BACKGROUND OF THE INVENTION

The invention involves a connection fitting for the attachment of oblong structures, for example of cables, hoses, tubes, corrugated hoses or the like, to an opening, in particular, to an opening or hole in a wall of a housing or the like, where the connection fitting has an attachment projection that projects axially in the plug-in direction, which is divided by slits into holding tongues running essentially in the axial direction, on the outer side of which holding projections are arranged which project radially outwardly and in the attachment position engage behind the edge of the opening when the mounting projection and its holding tongues are inserted into the opening. The mounting tongues have a shape that expands in the plug-in direction and correspondingly tapers in the withdrawal direction, on their attachment projections in their contact area, or they form a cone, so that the attachment tongues can be deformed in the radial direction during an axial movement of the connection fitting opposite to the plug-in direction. At a distance from the attachment projections, a sheath that has or forms a stopper is arranged which rests on the opening edge that lies opposite the edge of the opening that is engaged behind and which can be moved in the axial direction by reducing the distance to the attachment projections in order to generate a clamping force between the holding projections and the stopper.

A connection fitting of this general type is known from the U.S. Pat. No. 1,902,229. In this, the attachment projection has only two slits lying opposite each other and also smoothed out surfaces since the connection fitting consists of metal. The conical attachment projections are toothed in order to be able to press on the edge of the opening that is engaged behind. This means that at the latest during the attachment of this connection fitting, the edge of the opening is changed, which can be especially inhibitive to disassembly.

Furthermore, such an arrangement is unsuitable for a connection fitting in which the attachment projection consists of a synthetic material in a desired manner and for example, can be made in a cost-effective way in an injection molding process in large production quantities. In the reverse situation, directly for a synthetic material design of this type, there is the danger that the attachment projection is damaged by the hole edges and can be possibly pressed on hole edges that are not very precisely processed and thus, the axial movement that is necessary when affixing it is made more difficult or even stopped to the extent that a radial movement of the attachment tongues, to be caused by an axial movement, is prevented.

SUMMARY OF THE INVENTION

Therefore, the object for the invention is to create a connection fitting of the above-noted type which retains the advantages of a simple mounting ability by the latching of the attachment projection into an opening and the likewise simple bracing of an oblong structure through an axial withdrawal movement, without being impaired by the edge of the hole or in the necessary movements. In connection with this, it should be possible to also attach the connection fitting to an opening or hole, in which the edge that is grasped behind is imprecise or even notched.

To achieve this apparently contradictory object, the connection fitting defined at the beginning is characterized in that the sheath that has the stopper has a support that extends axially out from the stopper, and the support extends in the mounting position on the outer side of the retaining tongues of the mounting projection between the mounting projection and the inner wall of the opening that is engaged behind, and during an axial movement of the mounting projection and its attachment tongues, impinges a conical or tapering area of these attachment tongues and in this way, functions to press them together radially.

As opposed to the state of the art, where the sheath that forms a stopper is a union nut that has a ring-shaped flat front side that faces the hole or wall, a support is thus arranged on this front side in the solution according to the invention, which meshes into the opening and thus into the wall, i.e. lines this hole on the inside. This support is now used in order to impinge the attachment tongues in their conical area during the axial movement of the attachment projection opposite the plug-in direction, and to provide for pressing them together radially so that edges of the opening that are themselves damaged, notched, or sharp, do not impair these attachment tongues of the mounting projection and can not prevent their movements. Thus, in an advantageous way, a material can be selected for the attachment projection and its attachment tongues, which is oriented in the best possible way with the desired deformations during the affixing of an oblong structure and need not take into consideration the material of the wall in which the hole is located. In this way, a good flexible and resilient synthetic material can be applied, however, a manufacture out of metal is also conceivable. In an advantageous way, the connection fitting can thus be introduced as a simple plug-in fitting into a corresponding opening and then locked in it, and then an oblong structure that is introduced in it, for example, a cable with strain relief, is attached and clamped, such that the connection fitting can be withdrawn opposite the plug-in direction and in this way, the attachment projection can be pressed together radially, where the pressure force generating this radial movement, however, is applied completely or at least partially through the support that is provided according to the invention and extends into the opening, which allows a corresponding gentle impingement of the conical or tapering area of the attachment tongues.

For a fixed seat of the connection fitting in the assembly position within the opening, it is advantageous when the support can itself be expanded through the attachment tongues that can be pressed together radially by it and/or can be pressed against the inner wall of the opening at least locally in the mounting position. This results in not only a fixed seat, but also in a good security against twisting, which is most of all advantageous when the sheath that has or forms the stopper is able to be screwed on for its axial adjustment.

In this way, the radial expandability of the support can be supported by a corresponding material selection, especially however in that the support that projects in the axial direction on the stopper sheath and meshes in the assembly position into the hole, is divided by axially running slits, in particular open on the front side, into individual slide tongues. These slide tongues can thus be immediately firmly pressed when the connection fitting is braced, through the withdrawal movement of the attachment projection, on the inside of the opening or hole, and are in this way supported from the outside in. Thus, a fixed clamping of the entire connection fitting results in the opening and at the same time a correspondingly strong strain relief on the oblong structure, for example, on a cable or hose, is provided.

For a simple mounting and manufacturing, it is especially advantageous that the support and/or the slide tongues that form it are free of projections on the outer side. In a correspondingly simple manner, the support can be introduced into the opening or hole of a wall. Furthermore, after detaching the bracing, a simple disassembly is also possible. In addition, the production is simple, relative to an arrangement in which adjacent tongues must be provided with projections or recesses.

The support can therefore extend within a hypothetical sheath cylinder in the preliminary mounting position or relaxed position. Thus, it corresponds essentially to the common inner contours of openings or holes in housing walls, and can be easily introduced in them and after that, at least locally radially expanded, especially then when it is divided through axial slits into separate slide tongues that are open on the end.

The supports located on the stopper sheath can in the starting position of the clamping movement, extend to the retaining projections and have an entrance slope that acts together with a sloped surface of the mounting projections. In this way, the corresponding radial inwards movement of the attachment tongues having the attachment projections, which is supported by the entrance slope on the support or its slide tongues, readily begins immediately during a first axial return movement of the mounting projection. Especially by these entrance slopes, the surface pressing that occurs can also be reduced and an increased resistance by surface roughness can be avoided.

The support can have an axial dimension that corresponds to the axial expansion of the opening that is passed through by the attachment projection, at least for a fraction over half of it or completely, or it can have an axial dimension that exceeds this axial expansion. The support can thus line at least the largest part of the opening or hole in the usage position, and for certain application cases, however, may even project out over it on the inside. This is possible therefore, since the support also causes, in the axial movement of the connection fitting for its attachment, the radial movement of the attachment tongues, i.e. makes these movements for the most part independent of the opening.

At the same time, however, the support is itself clamped through this activation in the opening, so that it can also transfer the corresponding reaction forces to the attachment tongues. In the majority of cases, an attempt is made to make it so that the support and its slide tongues line the largest part of the inside of the opening, however, in an application of this same fitting to a wall having a smaller thickness, the attachment can also then occur when the support or its slide tongues extend beyond the inner edge of the opening that has a smaller dimension than this in the axial direction.

The number of slits on the support can correspond to the number of slits and the attachment tongues of the attachment projection. This results in a good reciprocal impingement and corresponding deformations during the clamping of the connection fitting.

An embodiment of the invention that is especially significant provides that the slits of the support and the slits of the attachment projection are set apart from each other in the mounting position in the circumferential direction and that on the attachment projections, guide elements or guide rails or the like are set up on the outside, which in the usage position fit into the slits of the support and mesh at least locally. In this way, during a reciprocal bracing under simultaneous performance of a rotational movement, a relative rotation occurs that prevents additional bracing is avoided. Should for example the axial movement of the attachment projection be caused to act against a first plug-in direction using a threading, a rotational movement must be performed which in the progression of the increasing clamping, opposes a larger and larger resistance. In this manner, under certain circumstances, the danger would result of a relative rotation of the attachment projection opposite the support, which is prevented by the reciprocal teeth between the guide components or guide rails on the attachment projections on the one side and the slits of the support on the other side. In this way, the slits of the support have an additional function, since they create a form fit between the support and the attachment projection in the circumferential direction via the guide components or guide rails.

An embodiment of the invention by which it is ensured that the attachment tongues, or even guide rails possibly provided on the outside of them, are not damaged by the edge of the opening that is engaged behind, and are prevented in their movement by this edge, can consist in that the free edge of the support or the slide tongues that form it impinge the mounting tongues and/or the guide rails on the outside in such a manner and affix it in the radial direction such that the outer circumference in the area of the edge of the opening to be engaged behind or that is engaged behind is equal to or in particular—preferably—somewhat smaller than the circumference of this edge and that the slope angle of the mounting tongues in the area of the support and/or the entrance slope on this support have such an angle that during the axial movement of the attachment projection in the direction towards this opening—i.e. opposite its original plug-in direction—the radial pressing together of the attachment tongues is so large that they continue to remain contact-free or at least essentially free of friction on the engaged behind edge of the opening. It is also provided through the selection of the slope surfaces on the attachment projections of the attachment tongues or on the support for this, that not only for the beginning of the clamping movement, but also in its continued progression, in which the mounting tongues are pulled more and more back into the opening, so that the slope surfaces provided on the outside of them can be effective, in the sense of a radial deformation, and not get into such a contact with the edge of the opening that is engaged behind, such that interlocking or damage could result. Moreover, it is especially desired that also in this way, a direct contact between the attachment tongues or attachment projections and the opening or its opening edge is avoided.

For an axial movement of the attachment projection without a relative rotation of the sheath that has the stopper and thus the support that meshes in the opening, it is expedient when the connection fitting has on its surface or edge that faces away from the attachment projection, a radially projecting abutment or a collar which forms an abutment for a shifting component, which is arranged between this collar and the stopper of the stopper sheath and presses the stopper and this collar apart in the axial direction. By the pushing apart of the stopper on the one hand and the abutment or collar on the other hand, the stopper is pressed against a wall that has the hole and at the same time, the remaining part of the connection fitting is withdrawn opposite the plug-in direction, which results in the desired axial movement in the area of the attachment projection, through which the radial pressing together of the mounting tongues is caused. In this manner, various mechanisms for moving apart the stopper and the abutment or collar can be applied.

It can be practical when the tensioning component between the collar and the stopper is a spring, and in particular a compression spring, or—for a targeted or adaptable clamping force that is in many cases preferred—is a threaded sheath that can be rotated away from the stopper for the tensioning, acting together with the outer threads on the stopper sheath.

In the first case, the user must, when setting the connection fitting in the opening, simultaneously compress the compression spring and then achieve the desired clamping by releasing it, which leads to an automatic clamping which is prescribed by the force of the compression spring and thus is also limited. In the second case, the user can screw tighten the threaded sheath such that it is moved along the stopper sheath axially by its stopper, so that the unit that includes a stopper sheath and threaded sheath provides an increasing axial dimension. Also this then leads to the desired tension since the collar or the abutment is moved away from the opening on the connection fitting in this manner, which automatically results in the partial pulling in of the attachment projection into the opening that is grasped from behind by this attachment projection, with the resulting radial deformation of the attachment tongues. In this manner, the user is able to control, by turning the threaded sheath to a greater or lesser extent, how strong the clamping should be or how wide the radial deformation of the attachment tongues that form the attachment projection should go. This solution thus makes possible an improved adaptation to variously sized oblong structures. Directly for such a solution, it is especially advantageous when the stopper sheath with the support that meshes in the hole and the attachment projection of the connection fitting are secured against a mutual turning; even after a short tensioning movement, the support is namely clamped within the opening so that even the increasing turning of the threaded sheath can no longer carry along with it the stopper sheath in the direction of rotation, even when a greater and greater torque is applied to the stopper sheath. Furthermore, the friction occurring on the abutment or collar through the threaded sheath can also not carry it along in the direction of rotation.

The stopper collar and the attachment projection with the attachment tongues and attachment projections as well as guide rails arranged on them if necessary, can be a single piece and in particular, consist of plastic. This results in a cost-effective manufacture from a material which is elastic, i.e. can transfer a corresponding axial movement of the attachment tongues into a radial movement via its slanted or conical design. At the same time, a spring-back can occur during assembly. It would also be possible, however, to manufacture it out of metal.

The attachment projection can have catches or equivalent retaining components on the front side, which grasp inwards for the capture of the oblong structure and/or to support a seal that lies on the inside. Thus, such a seal lying on the inside can overlap on its front side and be pressed during clamping onto the oblong structure on the outside.

Into the stopper, from which the support extends out, an elastic ring, sealing ring or O-ring can be arranged at a radial distance from this support, or connected to a part of its cross-section in a ring groove or equivalent recess, which has a larger diameter than the support, i.e. functionally surrounds it concentrically. Thus, in the stopper area, a seal and a certain elastic compression can also occur, which additionally opposes a rotation of the sheath that has the stopper, when for the clamping, a screw connection that is made relative this sheath is performed.

On the whole, resulting from a combination of individual or several of the aforementioned characteristics and measures, is a connection fitting that can be mounted in a simple way by plugging it into an opening, such that within the opening a slide bearing is constructed which is pressed during clamping against the inside of the opening in the housing wall and in this way, causes a resistance against rotation, if the bracing for its part occurs through a rotational movement and a threading. In this manner, this effect can be increased by a sealing ring or O-ring that is located on the stopper. Additional guide components or guide rails on the outer sides of the attachment tongues functioning as clamping components can thus be guided in the axial direction into the slits of the support that forms the slide bearing such that a rotation, of the attachment projection as well, and thus of the entire connection fitting is prevented. The collar that functions as an abutment on the connection fitting can in this way be held fixed during such a tensioning or even during the detachment of this bracing through a threaded sheath, until the corresponding clamping is achieved within the opening.

A threading for a union nut that is immediately available on the connection fitting is thus avoided. Nevertheless, a comparison of various thickness or sizes of the wall that has the opening can be made. For a solution with a threaded sheath that can be turned in order to generate the tensioning force, an attachment grip is available. At the same time, all individual parts can be connected to each other so that they are captive and a special assembly tool is avoided. Furthermore, the conical area especially, which causes the radial clamping and the strain relief, is connected as a single piece with the actual connection fitting and the part of the connection fitting that has the abutment or the collar. This results in a correspondingly stable connection fitting.

BRIEF DESCRIPTION OF THE SEVERAL VIEWS OF THE DRAWINGS

The foregoing summary, as well as the following detailed description of the preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

In the following description of various embodiments of a connection fitting that is identified on the whole by 1, parts that have the same function have been identified with the same reference numbers, even though they may be designed differently.

The connection fitting 1 functions for the attachment of oblong structures, in the embodiments depicted, of cables 2, but also of hoses, tubes, corrugated hoses or the like to an opening 3, which can be in particular a hole or an opening in a wall 4 of a housing or the like. The arrangement of the connection fitting 1 relative to such an opening 3 and a wall 4 can be recognized in FIGS. 2 to 4 and 6.

Figure 1:
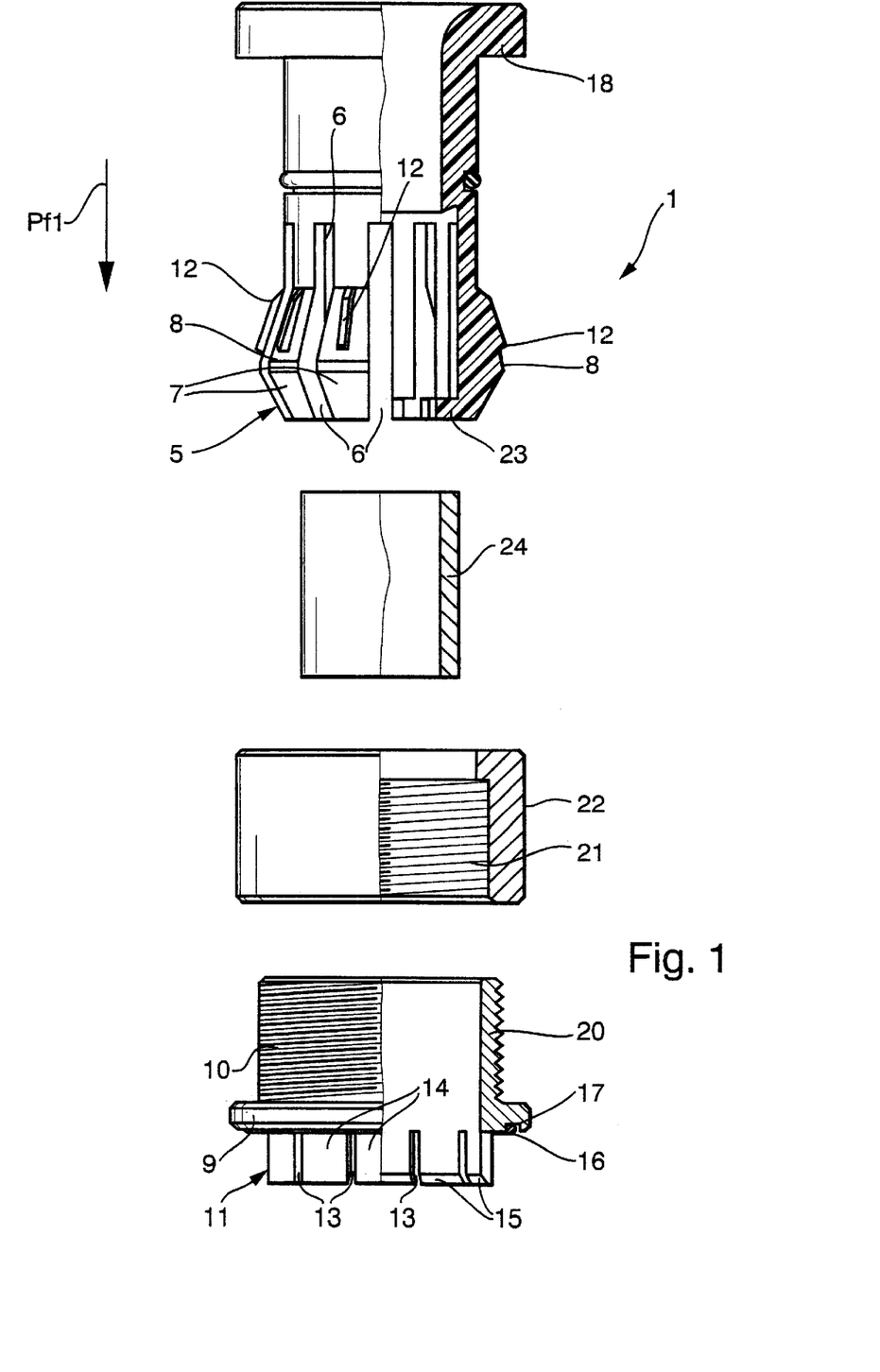
FIG. 1 is an exploded view, shown partially in longitudinal section and partially in side view, of an embodiment of the connection fitting according to the invention, in which a sheath that forms or has the stopper has an external threading to act together with a threaded sheath that can be rotated relative to it, so that the axial extension of the stopper sheath and the threaded sheath can be adjusted continuously and thus the threaded sheath can be pressed against a collar that functions as an abutment for bracing.
Figures 5, 6:
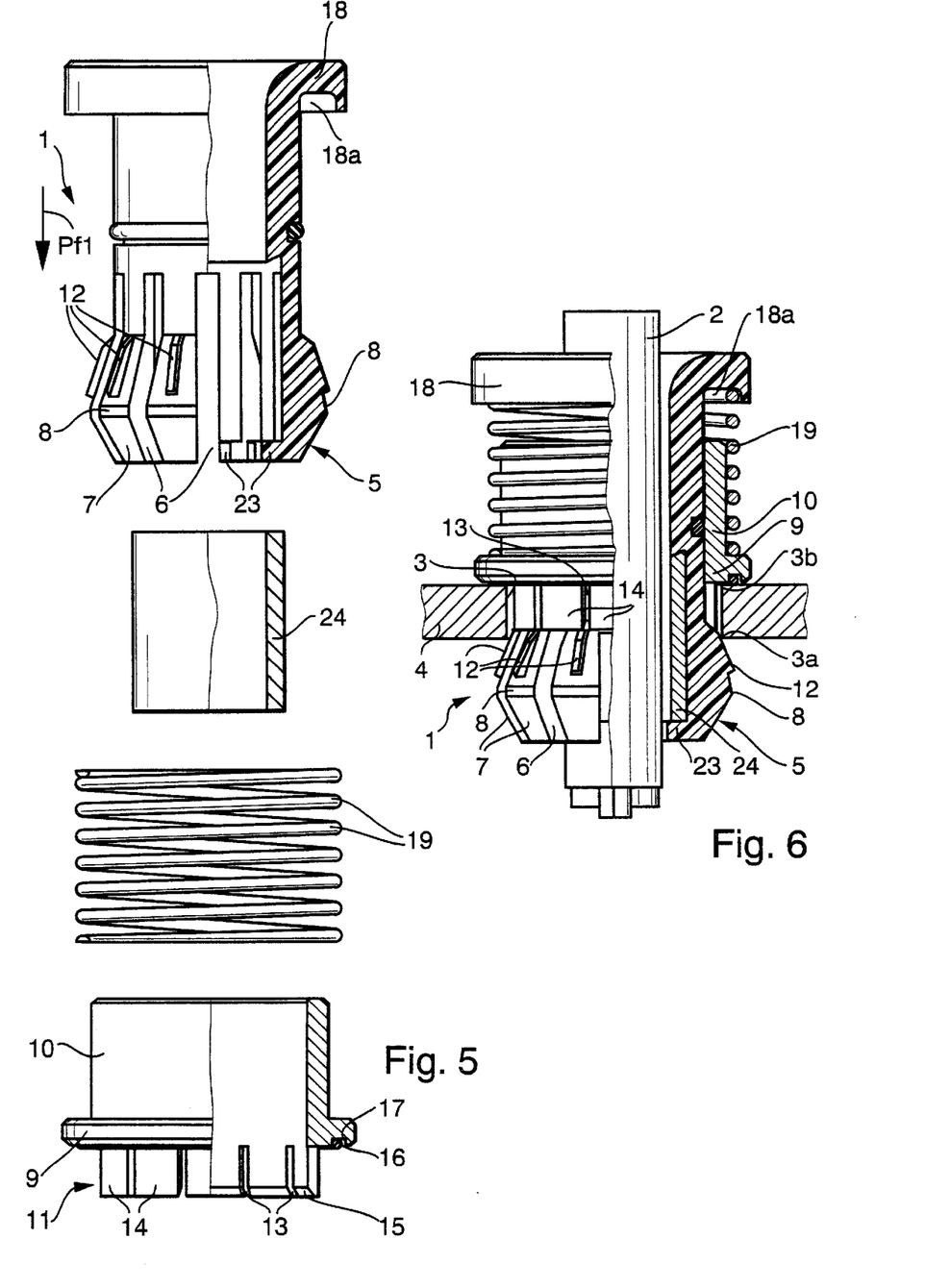
FIG. 5 is an exploded side view, shown partially in longitudinal section and partially in side view, of a modified embodiment form of the connection fitting, in which the axial movement is to be done in order to perform the bracing using a compression spring between the stopper sheath and the collar or abutment on the connection fitting.
FIG. 6 is a side view, partially in cross-section, of the embodiment according to FIG. 5 in a preliminary mounting position corresponding to FIG. 2, after the insertion into an opening or hole of a wall, but prior to the clamping with the hole and with the oblong structure.

In both embodiments, it will be recognized, especially in FIGS. 1 and 5, that the connection fitting 1 has an attachment projection 5 projecting axially in the plug-in direction according to the arrow Pf1, which is divided by slits 6 into the retaining tongues 7 running in the axial direction, on the outer side of which radially outwardly projecting retaining projections 8 are arranged, which move into the mounting position according to FIGS. 2 to 4 and 6 when the attachment projection 5 and its attachment tongues 7 are inserted into the opening 3 behind the edge 3a, engaging behind it.

The retaining tongues 7 thus have on their retaining projections 8 in their catch area, i.e. the area, which comes to lie in the usage position near to the edge 3a, a shape that expands in the plug-in direction according to the arrow Pf1 and accordingly tapers in the—opposing—withdrawal direction, and form approximately a cone. This leads to the retaining tongues 7 being able to be deformed during an axial movement of the connection fitting opposite their plug-in direction, i.e. out of its position depicted in FIGS. 2 and 6 into a position according to FIGS. 3 and 4, in the radial direction. At a distance from the mounting projections 8, a sheath 10 that has or forms a stopper 9, which is also called a "stopper sheath 10" is arranged, which rests in the mounting position on the opening edge 3b, which is generally the outside edge, and which lies across from the edge 3a of the opening 3 that is engaged behind, and in order to generate a clamping force between the mounting projections 8 and the stopper 9, can be moved in the axial direction by the reduction of the distance to the retaining projections 8, resulting in the radial deformation of the retaining tongues 7 that have the retaining projections 8 in the position depicted in FIGS. 3 and 4.

The sheath 10 that has the stopper 9 has in both embodiment examples, a support 11 that extends axially out from the stopper 9 (FIGS. 1 and 5), which in the assembly position extends and comes to lie on the outer side of the retaining tongues 7 of the attachment projection 5 between it and the inner wall of the opening 3 that is engaged behind, and during an axial movement of the attachment projection 5 and its retaining tongues 7, impinges a conical or tapering area of the retaining tongues 7, i.e. the corresponding conically designed retaining projection 8 of the retaining tongues 7, and thus functions for the radial deformation and compression during the corresponding relative movement. It is thus not the hole edge 3a itself that is directly used in order to transfer the axial movement of the retaining or attachment projection 5 against the plug-in direction into a radial deformation of the retaining or attachment tongues 7, but instead this occurs with the help of the support 11, so that even sharp-edged or fissured or notched edges 3a can not cause damages to the outside of the retaining tongues 7 and also can not cause any reciprocal undesired tooth forming at this position. Thus, the axial movement for the manufacture of the clamping is also not prevented by such a sharp-edged edge that might possibly dig into the outer side of the retaining tongue 7 or its mounting projection 8. Moreover, the support 11 shields the respective retaining tongue 7 opposite the opening 3 and especially also its inside edge 3a.

Figures 3, 4:
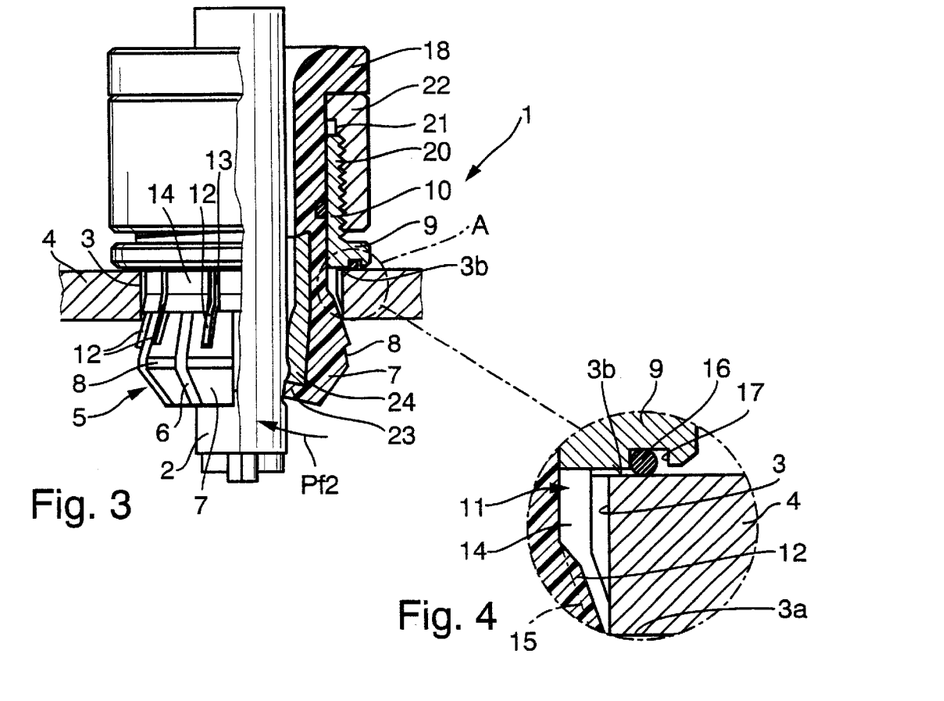
FIG. 3 is side view, partially in cross-section, corresponding to FIG. 2 after the adjustment of the threaded sheath opposite the stopper sheath in the axial direction for the enlargement of the overall dimension and thus for the bracing of the connection fitting in the hole on the one side, and on an oblong structure or cable on the opposite side.
FIG. 4 is an enlarged view of the detail marked by the circle A in FIG. 3 illustrating the clamping of a support located on the stopper sheath on the inside of the opening, where the outside of an attachment tongue and of a guide component located on it are set off at a distance from the edge of the opening that is engaged behind.

It is especially clear from FIG. 4 in this regard that the support 11 can itself be expanded radially through the retaining tongues 7 that are to be compressed radially by it and it can be pressed in the mounting position at least locally against the inner wall of the opening 3. It is mentioned at this position, that the support 11 that is partially visible in FIG. 4 is partially covered, i.e. has an essentially uniform radial thickness over its entire axial extension, in this case even by a guide component, or guide rail 12, lying in front of it as seen by the observer, which is to be described in the following.

Figure 2:
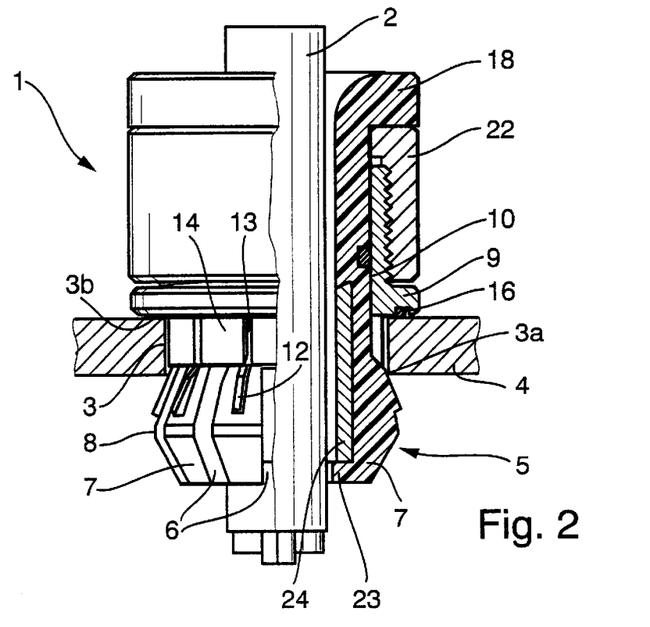
FIG. 2 is a side view, partially in cross-section, of the connection fitting according to FIG. 1 in the preliminary mounting position, i.e. after the insertion into a hole of a wall, however prior to attachment.

Especially in FIGS. 1 and 5, but also in FIGS. 2, 3 and 6, it will be recognized that in these embodiment examples that the support 11, which projects in the axial direction on the stopper sheath 10 and meshes in the opening 3 in the assembly position, is divided into individual slide tongues 14 by axially running slits 13 that are open on the front side. The support 11 and thus also the slide tongues 14 that form it are thus free of projections on the outside, i.e. are essentially smooth and can be inserted in a correspondingly easy manner into the opening 3 together with the entire connection fitting 1. The support 11 thus has in the preliminary mounting position or relaxed position according to FIGS. 1 and 5 an approximately cylindrical shape, and thus it could extend within an imaginary sheath cylinder. Thus, its outside is fitted to the greatest extent to the inside of an opening 3, which is generally cylindrically constructed. In the usage position, it thus has still more air or play according to FIGS. 2 to 4 and 6, even towards the inner wall of the opening 3.

According to FIGS. 2 and 5, the support 11 located on the stopper sheath 10 extends, as early as in the initial position of the clamping movement, up to the retaining projections 8, so that the relative axial movement is converted immediately into a corresponding radial swinging of the retaining tongues 7 that have retaining projections 8. Furthermore, it has an entrance slope 15 that acts together with a slanted surface of these retaining projections 8 and that is visible in FIG. 4 as a dashed line behind the already mentioned guide rail 12 and in addition, especially in FIGS. 1 and 5. This leads to a uniform introduction of the retaining projections 8 and thus of the retaining tongues 7 into the support 11, which makes easier the reciprocal axial movement for the guiding past of the radial swinging of the retaining tongues 7 according to the arrow Pf2 in FIG. 3, even if the slanted angle on the outside of the retaining projections 8 deviates from that of the slanted angle of the entrance slope 15 in the way recognized in FIG. 4, i.e. there is still angle space between the entrance slope 15 and the outside of the retaining projections 8, at least in the usage position.

The axial dimension of the support 11, i.e. the dimension from the stopper 9 to the free edge of the support 11 on the front side, is thus smaller in the embodiment example than the axial extension of the opening 3 that is passed through by the mounting projection 5, i.e. is somewhat smaller than the thickness of the wall 4 that has the opening 3 and thus corresponds to only a fraction of this wall thickness or axial extension of the opening 3. Thus, this axial extension of the support 11 certainly exceeds half of the axial expansion of the opening 3, so that the largest part of the opening 3 is lined by the support 11 and its slide tongues 14 in the usage position. When in the process the area of the edge 3a of the opening 3 that is engaged behind by the support 11 is released, i.e. is not lined, this thus has no influence on the fact that the outside of the retaining projections 8 and also the guide components or guide rails 12 are held at a—slight—distance from this edge 3a that is engaged behind. The radial thickness of the support 11 or the slide tongues 14 and the slope of the outside of the retaining projections 8 are thus determined such that even in the assembly position according to FIGS. 3 and 4, no contact occurs between the edge 3a that is engaged behind and the retaining projections 8 and the guide rails 12, i.e. in spite of the force acting in the axial direction, no impressions or damages can be caused by the edge 3a that can be sharp-edged under certain circumstances.

Of course, the support 11 could also, however, line the entire opening 3 or possibly even project somewhat over the edge 3a. It would come to this, for example, if the connection fitting 1 was attached according to FIGS. 1 to 6 in the dimension shown which goes through a wall 4 of smaller thickness.

The number of slits 13 in the support 11 and the number of slits 6 as well as the retaining tongues 7 on the attachment projection 5 are the same in the described embodiment. However, the slits 13 of the support 11 and the slits 6 of the attachment projection 5 according to FIGS. 2, 3 and 6 are displaced relative to each other in the circumferential direction in the mounting position—by a division in half. Thus, a slit 6 is covered on the attachment projection 5 at least within the opening 3 by a slide tongue 14 on the outside, whereas in the reverse situation, a slit 13 of the support 11 is covered on the inside of a mounting tongue 7 at least by a first partial axial area.

In this way, an additional functional embodiment is possible which is provided in both described embodiments and provides that on the attachment projections 8 and thus the outer sides of the retaining tongues 7 on their slanted surface that faces towards the edge 3a of the opening 3, the aforementioned guide components or guide rails 12, which in the usage position fit into the slits 13 and mesh locally, can be arranged on the outside, and create a form fit in the rotational direction. In this way it is achieved that during the bracing and clamping of the connection fitting 1 through the pressing on of the support 11 and its slide tongues 14 inside the opening 3, not only this one, but also the entire connection fitting 1 can be made so that it does not rotate. The greater the clamping becomes, the less the entire connection fitting can be turned, since the stopper sheath 10 clamps fixedly via the support 11 in the opening 3 and the retaining tongues 7 are for their part, not only friction fit by their retaining projections 8 on the inside in the support 11 on the slide tongues 14, but instead additionally coupled via the guide components 12 in a form-fit manner.

In addition, an elastic ring or sealing ring, an O-ring 16 in the described embodiment, is arranged in the stopper 9, from which the support 11 extends, at a radial distance from this support 9. This ring is attached by a part of its cross-section into a ring-groove 17 or similar recess, and can be pressed together somewhat during the clamping of the connection fitting 1, and thereby simultaneously increases the friction between the stopper 9 and the wall 4. This contributes to securing against turning of the entire connection fitting 1 so that it can also take on forces or moments in the turning direction, which for example, can occur in the embodiment form according to FIGS. 1 to 3 when tightening a thread for bracing and clamping, which is described in greater detail in the following.

In this manner, this affixing is also done in the direction of rotation, although the open edge of the support 11 that faces away from the stopper 9 and the slide tongues 14 that form it impinge the retaining tongues 7 and also the guide rails 12 on the outside in such a way and affix it in the radial direction so that its outer circumference in the area of the edge 3a, which is to be engaged behind or is engaged behind, of the opening 3 is smaller in the embodiment example than, but possibly, however, also just equal to, the circumference of this edge 3a, and although the slant angle on the outside of the retaining tongues 7 and retaining projections 8 have such an angle in the area of the support 11 and its entrance slope 15, that during the axial movement of the attachment projection 5 in the direction to the opening 3, i.e. opposite the plug-in direction indicated by the arrow Pf1, the radial compression of the retaining tongues 7 is so great that they continue to stay free of contact or at least without friction on the edge 3a of the opening 3 that is engaged behind.

The friction is, on the contrary, generated within the opening 3 between the opening and the outside of the support 11 on the one hand, and between the inside of the support 11 and the outside of the retaining tongues 7 or the retaining projections 8, such that in addition, a rotational security with the guide components 12 is still available. Thus, a secure and stable attachment to the opening 3 is made, although in an apparently reciprocal manner, the areas of the retaining tongues 7 that grasp behind the inside edge 3a of the opening 3 do not or hardly contact the edge 3a that is grasped behind.

In order to apply the axial force against the plug-in direction, i.e. opposite to the arrow Pf1 on the connection fitting, it has on its area or edge which faces away from the attachment projection 5 in both described embodiments, a radially projecting abutment in the form of a ring-shaped collar 18 that forms an abutment for a shifting or tensioning component that is respectively designed in a somewhat different manner, which is arranged between this collar 18 and the stopper 9 of the stopper sheath 10, and presses the stopper 9 and the collar 18 apart in the axial direction. If by such a shifting component that is to be explained in greater detail, the distance between the collar 18 and the stopper 9 is enlarged, this automatically means a reduction in the distance of the stopper 9 from the retaining projections 8 of the retaining tongues 7 of the attachment projection 5 and thus its clamping and radial swinging, since then the open edge of the support 11 is shifted to the sloped retaining projections 8 or reversed, these retaining projections 8 are drawn into the support 11 and because of their outer side slopes are at the same time swung radially inwardly.

This shifting or tensioning component between the collar 18 and stopper 9 is a spring in the embodiment according to FIGS. 5 and 6, and to be precise, a compression spring 19, which allows the introduction of the attachment projection 5 into the opening 3 in the compressed condition, since the distance between the stopper 9 and the retaining projections 8 is still correspondingly large while the de-tensioning of this compression spring 19 acts to press the stopper 9 and the collar 18 apart, so that after a release of the spring force of the compression spring 19, the previously described tensioning and clamping of the connection fitting 1 occurs.

FIG. 6 shows the not yet tensioned and clamped arrangement, in which the compression spring 19 is for its part still compressed, such that it is easily imagined that in a corresponding release of the compression spring, when it is thus relaxed in a shape as is recognized in FIG. 5, the tensioning and clamping is done in a comparable manner to that of FIG. 3.

FIG. 6 thus shows a condition in which the user grasps on the collar 18, for example, and holds it pressed down in the direction to the wall 4. If he lets it go, the connection fitting 1 is moved back by the compression spring 19 in the axial direction opposite the plug-in direction indicated by the arrow Pf1 and thus is clamped to its attachment projection 5, such that at the same time, the attachment tongues 7 are swung radially inwardly and pressed against the oblong structure i.e. the cable 2, or even somewhat pressed into its surface somewhat, according to the arrow Pf2 in a manner similar to the arrangement of FIG. 3.

In the embodiment example according to FIGS. 1 to 3, the tensioning component is a threaded sheath 22 that has an inner threading 21 that acts together with an outer thread 20 on the stopper sheath 10 and that can be rotated away from the stopper 9 for tensioning. Whereas the arrangement in FIG. 2 is depicted in the position that is already inserted into the opening 3, but still non-tensioned, FIG. 3 shows how the threaded sheath 22 is shifted in the axial direction, through several rotations because of the threads 20 and 21 that act together, in such a way that the unit that includes the threaded sheath 22 and the stopper sheath 10 obtains a larger axial length, which leads to the collar 18 that functions as an abutment obtains a larger separation distance from the outside of the wall 4. This can only be offset in that—as in the embodiment example according to FIGS. 5 and 6-the attachment projection 5 is drawn in again by its retaining tongues 8 into the opening 3 and thus into the supports 11 of the stopper sheath 10, which because of the dimensions and the slanted surfaces, leads to the radial swing of the attachment tongues 7 already mentioned several times, in the direction of the arrow Pf2 and against the surface of the cable.

If, as in both detailed embodiments, the connection fitting 1 is made of an elastic material, in particular plastic, the connection fitting 1 can also be detached again during a reverse movement of the components and parts since during a shortening of the separation distance between the stopper 9 and the collar 18, the entire connection fitting 1 can be moved again somewhat in the direction of the arrow Pf1, so that the retaining tongues 7 are swung away from the cable 2 because of their elasticity so that it can be pulled out and after that also the entire connection fitting 1 can be pulled back again out of the opening 3.

Moreover, the stopper collar 18 and the attachment projection 5 with the retaining tongues 7 and the retaining projections 8 as well as the guide rails 12 are made in both described embodiments as a single piece made of the same material, in particular plastic.

The collar 18 that functions as an abutment is designed somewhat differently in the two describes embodiments. In order to grasp the one edge or end of the compression spring 19, the collar 18 of the embodiment according to FIGS. 5 and 6 has a ring groove 18a, whereas it runs radially in the embodiment example according FIGS. 1 to 4 and is flat and smooth so that the threaded sheath 22 can be easily turned with respect to this collar 18, when the tension movement or even the detachment movement is performed.

It is also mentioned that the two embodiment forms of the attachment projection 5 and thus the retaining tongues 7 have on the front side, claws 23 that grasp to the inside or similar retaining components for better grasping of the oblong structure or cable 2 and at the same time, for the support of an inner-lying seal, in the embodiment example a seal collar 24. Thus, this seal 24 can be affixed on the inside and pressed onto the cable 2, but also remains, however, captive in the relaxed position and preliminary assembly position and in addition, the aforementioned claws 23 can be buried or attached somewhat in an elastic surface of a cable 2, hose or even in the corrugated troughs of a corrugated hose.

The connection fitting 1 functions for the attachment of oblong structures, for example of cables 2, hoses, tubes, corrugated hoses or the like, to an opening 3, in particular, for passing through such an opening 3 while at the same time being attached, where this opening 3 involves a hole, a drill hole, or other opening in a wall 4, for example of a housing. The connection fitting 1 is thus constructed as a plug-in fitting, i.e. is readily affixed to the opening 3 by axial insertion into it. For this it has an attachment projection 5 which is subdivided by axial slits into holding tongues which have radially projecting retaining projections 8 on the outside that extend behind the edge 3a of the opening 3 when the attachment projection 5 is inserted into the opening 3, such that they yield somewhat radially to the inside during insertion and after being stuck through, automatically move again radially to the outside. By an axial movement of the connection fitting 1 opposite its plug-in direction, the retaining tongues 7 can in turn be deformed in the radial direction against the oblong structure or a cable 2 that is to be affixed and then clamped onto it. Thus, on the outside of the opening 3, a stopper 9 is provided so that the connection fitting 1 is supported on the outside. The sheath that has the stopper 9 has a support 11, which extends axially into the opening 3 and which in the assembled position grasps on a partial area of the outside of the retaining tongues 7 of the attachment projection 5, and during an axial movement of the attachment projection 5 and its retaining tongues 7, impinges a conical or tapering area of these retaining tongues 7 on the outside in such a way that the retaining tongues 7 are pressed together in the radial direction so that a contact of the retaining tongues 7 with the edge 3a that is engaged behind is avoided or if necessary done with a considerably less force than is applied for a radial deformation of the retaining tongues 7.

What is claimed is:

1. Connection fitting (1) for attachment of an oblong structure (2) to an opening (3) or hole in a wall (4) the connection fitting (1) comprising an attachment projection (5) that projects axially in a plug-in direction, which is divided by slits (6) into retaining tongues (7) which extend essentially in an axial direction, radially outwardly projecting retaining projections (8) being arranged on an outer side of the retaining tongues (7) which are movable into an attachment position engaging behind an edge (3a) of the opening (3) upon the attachment projection (5) and the retaining tongues (7) being inserted into the opening (3), the retaining tongues (7) have a shape on the retaining projections (8) in a contact area that expands in the plug-in direction and correspondingly tapers in the withdrawal direction or forms a cone, so that the retaining tongues (7)

can be deformed in the radial direction during an axial movement of the connection fitting (1) opposite the plug-in direction, and a sheath (10) that includes a stopper (9) is arranged at a distance from the retaining projections (8) and rests on an opposing opening edge (3b) that lies opposite the edge (3a) of the opening (3) that is engaged behind and is movable in the axial direction by a reduction of the distance to the retaining projections (8) in order to generate a clamping force between the retaining projections (8) and the stopper (9), the sheath (10) that includes the stopper (9) has a support (11) that extends axially out from the stopper (9), and the support (11) extends in the mounting position on the outer side of the retaining tongues (7) of the attachment projection (5) between the mounting projection (5) and an inner wall of the opening (3) that is engaged behind and during an axial movement of the mounting projection (5) and the retaining tongues (7), impinges a conical or tapering area of the retaining tongues (7) to press them together radially, wherein a radially projecting abutment or a collar (18) which forms an abutment for a tensioning component is located on a surface or edge of the connection fitting that faces away from the attachment projection (5), and a tensioning component is arranged between the collar (18) and the stopper (9) of the stopper sheath (10) and presses the stopper (9) and this collar (18) apart in the axial direction.

2. Connection fitting according to claim 1, wherein the support (11) is expandable via the attachment tongues (7) that are pressed together radially such that the support (11) can be pressed against the inner wall of the opening (3) at least locally in the mounting position.

3. Connection fitting according to claim 1, wherein the support (11) that projects in the axial direction on the stopper sheath (10) and is adapted to be inserted into the opening (3), in the assembly position, is divided by axially running slits (13) into individual slide tongues (14).

4. Connection fitting according to claim 3, wherein the support (11) and the slide tongues (14) are free of projections on an outer side.

5. Connection fitting according to claim 1, wherein the support (11) has a shape of a sheath cylinder in the preliminary mounting position or relaxed position.

6. Connection fitting according to claim 1, wherein the support (11) located on the stopper sheath (10) can, in the starting position of the clamping movement, extend to the retaining projections (8) and have an entrance slope (15) that acts together with a sloped surface of the retaining projections (8).

7. Connection fitting according to claim 1, wherein the support (11) has an axial dimension that corresponds to or exceeds an axial length of the opening that is passed through by the attachment projection, at least for a portion over half of the opening.

8. Connection fitting according to claim 3, wherein that a number of the slits (13) on the support (11) corresponds to a number of the slits (6) and the attachment tongues (7) of the attachment projection (5).

9. Connection fitting according to claim 8, wherein the slits (13) of the support (11) and the slits (6) of the attachment projection (5) are spaced apart a distance from each other in a circumferential direction in the assembly position and that guide components or guide rails (12) are arranged in a similar manner on an outside of the attachment projections (8) and fit into the slits (13) of the support in the usage position and mesh at least locally.

10. Connection fitting according to claim 9, wherein a free edge of the support (11) or the slide tongues (14) that form the support impinge at least one of the mounting tongues (7) and the guide rails (12) on the outside in such a manner and affix it in a radial direction such that an outer circumference in an area of the edge (3a) of the opening (3) to be engaged behind or that is engaged behind is smaller than or equal to the circumference of the edge (3a) and that the slope angle of the mounting tongues (7) in the area of at least one of the support (11) and the entrance slope (15) on the support have such an angle that during axial movement of the attachment projection (5) in a direction towards the opening (3), a radial pressing together of the attachment tongues (7) is so large that the attachment tongues continue to remain essentially free of friction on the engaged behind edge (3a) of the opening (3).

11. Connection fitting according to claim 1, wherein a radially projecting abutment or a collar (18) which forms an abutment for a tensioning component is located on a surface or edge of the connection fitting that faces away from the attachment projection (5), and a tensioning component is arranged between the collar (18) and the stopper (9) of the stopper sheath (10) and presses the stopper (9) and this collar (18) apart in the axial direction.

12. Connection fitting according to claim 1, wherein the tensioning component between the collar (18) and the stopper (9) is one of a spring and a threaded sheath (22) that acts together with outer threads (20) on the stopper sheath (10) and can be rotated away from the stopper (9) for the tensioning.

13. Connection fitting according to claim 12, wherein the stopper collar (18) and the attachment projection (5) with the retaining tongues (7), retaining projections (8) and guide rails (12) arranged on them are formed as a single piece.

14. Connection fitting according to claim 1, wherein the attachment projection (5) has catches (23) or retaining components on a front side, which extend inwardly to the oblong structure and supporting a seal (24) that lies inside the attachment.

15. Connection fitting according to claim 1, wherein an elastic ring, sealing ring or O-ring (16) is arranged in a ring groove (17) in the stopper (9) at a radial distance from the support.

16. Connection fitting according to claim 1, wherein the fitting (1) is for attachment of an oblong structure selected from the group consisting of cables, hoses, tubes, and corrugated hoses.

17. Connection fitting according to claim 1, wherein the connection fitting (1) is for attachment to an opening (3) or hole in a wall (4) of a housing.

* * * * *